United States Patent

Kolchinsky

[11] Patent Number: 5,842,679
[45] Date of Patent: Dec. 1, 1998

[54] ADJUSTABLE STROKE SOLENOID OPERATED CARTRIDGE VALVE

[75] Inventor: Abel E. Kolchinsky, Riverwoods, Ill.

[73] Assignee: Sterling Hydraulics, Inc., Schaumburg, Ill.

[21] Appl. No.: 804,099

[22] Filed: Feb. 20, 1997

[51] Int. Cl.⁶ .................. F16K 31/05; F16K 31/04
[52] U.S. Cl. .................. 251/30.04; 251/38; 251/42; 251/44; 251/129.18
[58] Field of Search ............ 251/30.01, 30.02, 251/30.03, 30.04, 30.05, 38, 42, 43, 44, 129.18, 129.15

[56] References Cited

U.S. PATENT DOCUMENTS

| | | | |
|---|---|---|---|
| 3,115,891 | 12/1963 | Kimm | 251/30.03 |
| 3,307,823 | 3/1967 | Greer | 251/30.03 |
| 3,612,476 | 10/1971 | Leitgeb | 251/38 |
| 4,304,264 | 12/1981 | McClintock | 251/30.04 |
| 4,305,566 | 12/1981 | Grawunde | 251/30.02 |
| 4,494,726 | 1/1985 | Kumar et al. | 251/30.04 |
| 4,526,340 | 7/1985 | Kolchinsky et al. | 251/38 |
| 4,544,128 | 10/1985 | Kolchinsky et al. | 251/30.01 |
| 4,662,600 | 5/1987 | Schwelm | 251/30.03 |
| 4,679,765 | 7/1987 | Kramer et al. | 251/30.04 |
| 4,725,039 | 2/1988 | Kolchinsky | 251/129.15 |
| 4,790,345 | 12/1988 | Kolchinsky | 251/129.15 |
| 4,995,586 | 2/1991 | Gensberger et al. | 251/30.04 |
| 5,002,253 | 3/1991 | Kolchinsky et al. | 251/30.03 |
| 5,205,531 | 4/1993 | Kolchinsky | 251/30.04 |
| 5,271,599 | 12/1993 | Kolchinsky et al. | 251/30.04 |
| 5,423,347 | 6/1995 | Weber | 251/30.04 |
| 5,564,674 | 10/1996 | Kalin | 251/38 |

FOREIGN PATENT DOCUMENTS 518044  11/1955  Canada ............... 251/30.03

*Primary Examiner*—George L. Walton
*Attorney, Agent, or Firm*—Wood, Phillips, VanSanten, Clark & Mortimer

[57] ABSTRACT

A lower cost valve results from the use of a single machined part for a valve housing. The housing is made of a non-magnetic material which can be less expensive and eliminates the requirement for screens or filters in automotive applications. Providing a one-piece plunger and pilot valve with a high guiding length minimizes tilting of the pilot. Further, the one-piece housing allows for one common bore for guiding the plunger with the pilot and a poppet. The two ideal concentric surfaces make the poppet outer diameter concentric to the pilot hole. Finally, the use of an adjustable stroke valve eliminates the need for a separate needle valve, providing further cost savings.

21 Claims, 2 Drawing Sheets

ADJUSTABLE STROKE SOLENOID OPERATED CARTRIDGE VALVE

FIELD OF THE INVENTION

This invention relates to valves and, more particularly, to an adjustable stroke solenoid operated cartridge valve.

BACKGROUND OF THE INVENTION

In one form of a fluid flow control valve, a flow control element or valve member is movably positioned in a valve chamber between first and second valve positions for selectively fluidically coupling valve ports. The flow control element may be directly actuated by a solenoid operated plunger operatively associated with the flow control element. Alternatively, the flow control element may be actuated by a pilot valve which is directly actuated by a solenoid operated plunger. In either case, the solenoid controllably positions the plunger to move either the flow control element to an actuated position or the pilot valve to an actuated position to allow movement of the valve member.

Typically, the valve chamber is provided by a two-piece valve housing of a magnetic material capable of withstanding high fluid pressure. The plunger is slidably received in a sleeve braised between the valve housing and a tube stop. To bias the plunger to a normal or an actuated position, the plunger typically includes a counterbore at either end receiving a spring biasing the plunger in a suitable direction. This type of assembly requires increased manufacturing cost. Also, misalignment can occur while braising the sleeve to the tube housing.

One application for a cartridge valve of the two position type is in automobiles. Automobiles use single acting cylinders operated at relatively low pressure on the order of 500–600 psi, with 1000 psi being maximum. As a plurality of valves may be necessary in an automobile, economies in manufacturing are desirable to provide cost effective solutions to satisfy control requirements.

In higher pressure applications, a poppet type cartridge valve is required. With such a valve the poppet has a pilot hole and an orifice. It is necessary to catch the pilot valve in the pilot hole. As such, it must be properly guided and therefore must be concentric in the poppet bore. Also, the pilot valve is conventionally connected to the plunger with a pin which allows for floating of the two parts relative to one another. This further makes it more difficult to provide the required centering of the pilot valve relative to the pilot hole.

A specific automotive application for cartridge valves is in connection with so called "low rider" automobiles. The typical shock absorber is replaced with an hydraulic cylinder. A motor operated hydraulic power unit in the trunk applies pressure to the cylinder to raise the vehicle. The cartridge valve is used to lower the vehicle. The cartridge valve controls return flow from the cylinder to the tank. Lowering speed may be controlled with a needle valve to limit return flow rate. This requires an additional component and additional hydraulic connections.

The present invention overcomes one or more of the problems discussed above.

SUMMARY OF THE INVENTION

According to the invention, a low cost cartridge valve is provided having adjustable stroke.

It is one object of the invention to provide a cartridge valve including a one-piece valve housing.

It is another object of the invention to provide a cartridge valve using a one-piece pilot valve and plunger guided in a common bore.

Broadly, there is disclosed herein a solenoid operated cartridge valve comprising an elongate cylindrical valve housing having an axial throughbore defining an interior chamber, one end of the housing comprising a port end including a plurality of port openings, and an axial opposite end comprising a sleeve end receivable in a solenoid, in use. A valve member is movable in the chamber at the port end between first and second valve positions for selectively coupling the port openings, the valve member having an axial pilot throughbore defining a pilot chamber. A solenoid plunger is movable in the interior chamber at the sleeve end. A pilot valve is movable in the pilot chamber for selectively opening or closing the pilot throughbore. Means are provided for coupling the pilot valve to the plunger for axial movement therewith for selectively positioning the pilot valve, and thus also the valve member. A stop is mounted to the valve housing at the sleeve end for retaining the plunger in the chamber to provide full stroke movement of the pilot valve between first and second axial positions. Biasing means are operatively associated with the plunger for normally maintaining the pilot valve in one of the first and second axial positions. Adjustable means are operatively associated with the valve housing for adjustably limiting movement of the pilot valve between the first and second axial positions to control flow rate through the cartridge valve.

It is a feature of the invention that the coupling means comprises the plunger being integral with the pilot valve.

It is another feature of the invention that the pilot through opening comprises a relatively large diameter counterbore opening into the chamber coupled to a relatively small diameter coaxial pilot hole adjacent the housing port end.

It is a further feature of the invention that the pilot valve is loosely received in the counterbore and the pilot valve has a needle end received in the pilot hole for selectively opening or closing the pilot hole.

It is still another feature of the invention that the plunger is an elongate plunger having an outer diameter slightly less than an inner diameter of the housing throughbore to maintain the plunger centered in the valve housing so that the pilot valve needle end is concentric with the pilot hole.

It is yet another feature of the invention that the valve housing is of a non-magnetic material.

It is still an additional feature of the invention that the biasing means comprises a spring received in the chamber and acting between the stop and the plunger for normally maintaining the valve member in one of the first and second valve positions.

It is still an additional feature of the invention that the adjustable means comprises an elongate rod extending through said valve housing for selectively engaging the pilot valve to limit movement between the first and second axial positions.

It is still yet a further feature of the invention that the adjustable means further comprises a screw operatively associated with the rod, the screw being threadably received in the housing for adjusting axial position of the rod in the valve housing.

It is still another feature of the invention to provide a lock nut threaded to the screw for maintaining the rod in a desired axial position.

In accordance with another aspect of the invention there is disclosed herein an elongate cylindrical valve housing having an axial counterbore at a sleeve end defining an interior chamber, an axial opposite port end of the housing having an axial throughbore opening to the interior chamber to provide an end port opening and defining a valve seat, and a radially extending through opening in the housing opening in the said interior chamber and defining a side port opening, the sleeve end being receivable in a solenoid, in use. A valve member is movable in the chamber between a first valve position seated on the valve seat for selectively preventing coupling between the end and side port openings, and a second valve position spaced from the valve seat for coupling the end and side port openings, the valve member having an axial pilot throughbore defining a pilot chamber. A solenoid plunger is movable in the interior chamber at the sleeve end. A pilot valve is movable in the pilot chamber for selectively opening or closing the pilot throughbore. Means are provided for coupling the pilot valve to the plunger for axial movement therewith for selectively positioning the pilot valve, and thus also the valve member. A stop is mounted to the valve housing at the sleeve end for retaining the plunger in the chamber to provide full stroke movement of the pilot valve between first and second axial positions. Biasing means are operatively associated with the plunger for normally maintaining the valve member in one of the first and second valve positions. Adjustable means are operatively associated with the valve housing for adjustably limiting movement of the pilot valve between the first and second axial positions to control flow rate through the cartridge valve.

In accordance with the invention, a lower cost valve results from the use of a single machined part for the valve housing. Moreover, the housing is made of a non-magnetic material which can be less expensive and eliminates the requirement for screens or filters in automotive applications. Similarly, threadably connecting the tube stop to the valve housing sleeve end eliminates the requirement of braising in manufacturing. Providing a one-piece plunger and pilot valve with a high guiding length minimizes tilting of the pilot. Further, the one-piece housing allows for one common bore for guiding the plunger with the pilot and the poppet. The two ideal concentric surfaces make the poppet outer diameter concentric to the pilot hole. Finally, the use of an adjustable stroke valve eliminates the need for a separate needle valve, providing further cost savings, and eliminating additional hydraulic connections.

Further features and advantages of the invention will readily be apparent from the specification and from the drawings.

DETAILED DESCRIPTION OF THE INVENTION

Figure 1:
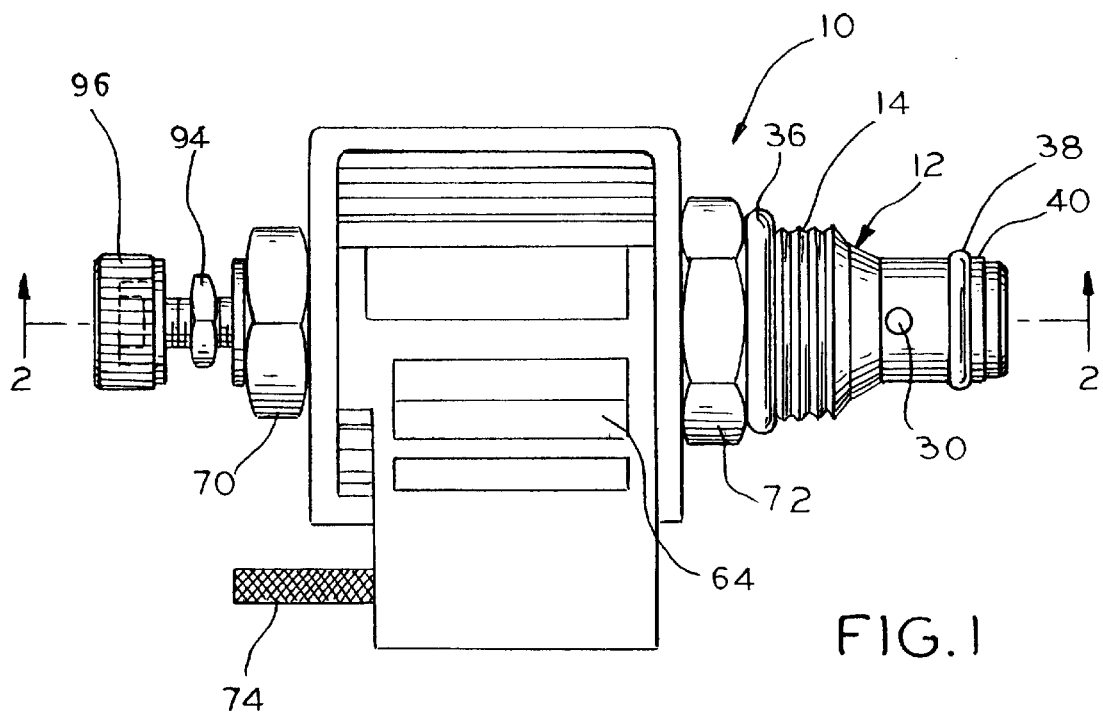
FIG. 1 is a side view of an adjustable stroke solenoid operated cartridge valve according to the invention.

FIG. 1 illustrates a solenoid operated cartridge valve 10 according to the invention.

The valve 10 includes a stationary valve housing 12 having a threaded outer portion 14 adapted to be threaded into a fluid port (not shown).

Figure 2:
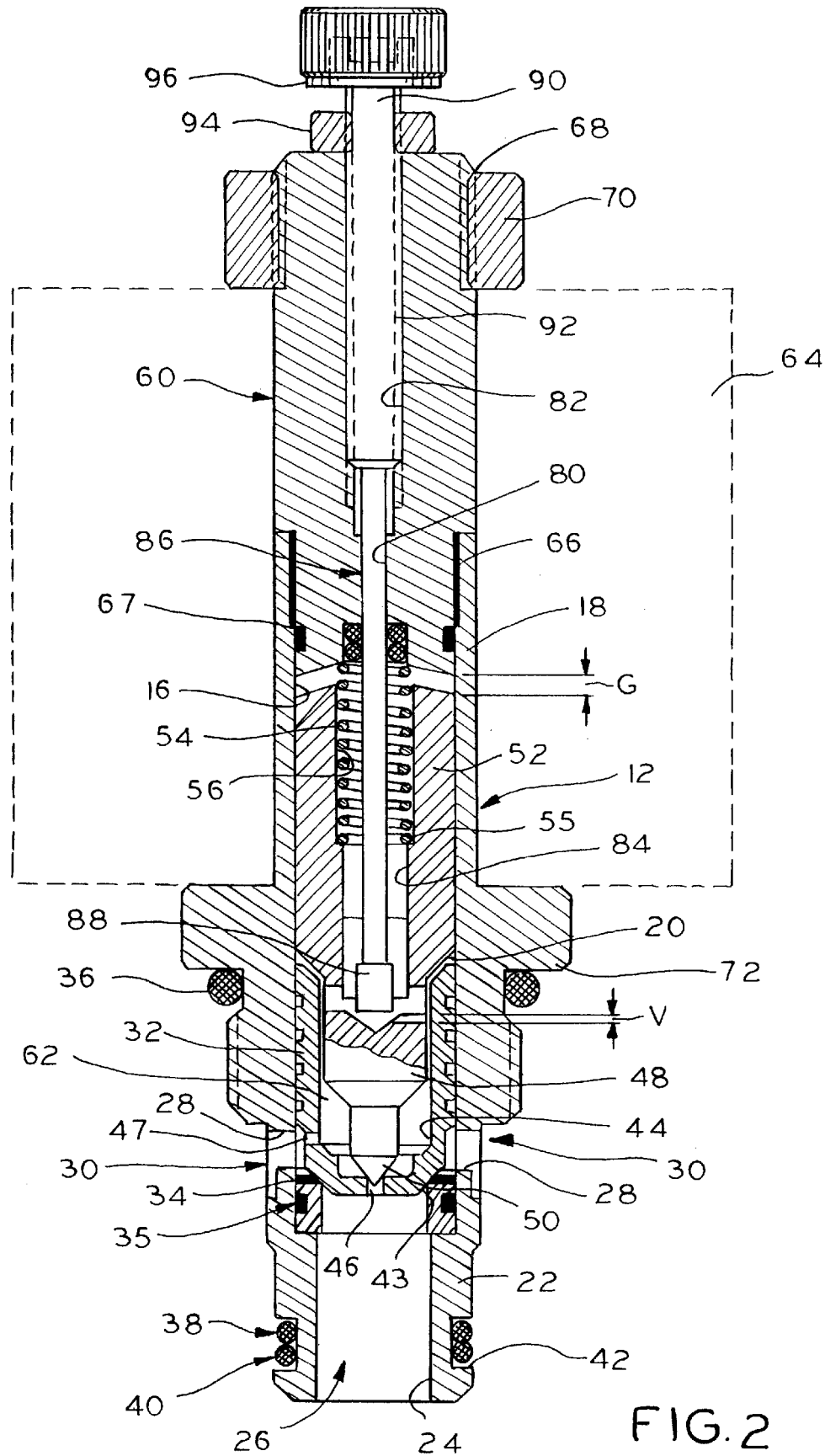
FIG. 2 is a sectional view taken along the line 2—2 of FIG. 1, with the solenoid shown in phantom.

With reference also to FIG. 2, the valve housing 12 is of elongate, one-piece cylindrical construction having an axial counterbore 16 at a sleeve end 18 defining an interior chamber 20. An axially opposite housing port end 22 has an axial throughbore 24 opening to the interior chamber 20 to provide an end port opening 26. A plurality of radially extending through openings 28 in the housing 12 open into the interior chamber 20 and define side ports 30. The end port 26 is selectively opened or closed by a valve member, or poppet 32 seating on an annular valve seat 34 where the throughbore 24 opens into the interior chamber 20. The valve seat 34 is sealed in the bore 16 with an O-ring 35.

First and second sealing rings 36 and 38 are provided on the valve housing 12 for sealing the valve assembly within the fluid port. A backup ring 40 is associated with the sealing ring 38 in a suitably outwardly opening, annular recess 42 of the valve housing 12.

As used herein, the relative term "outer" or "outward" refers to a direction axially toward the port end 22, and the relative term "inner" or "inward" refers to a direction axially away from the port end 22, i.e. axially toward the sleeve end 18.

When the valve 10 is installed in a suitable fluid port, fluid pressure between the seals 36 and 38 is applied through the side ports 30 against the poppet 32. In the illustrated embodiment, the poppet 32 has an outer seating portion 43 engaging the valve seat 34. The poppet 32 is movable in the interior chamber 20 between a first valve position as shown seated on the valve seat 34 for selectively preventing coupling between the end port 26 and the side port 30, and a second valve position, not shown, spaced from the valve seat 34 for fluidically coupling the end port 26 with the side ports 30.

The poppet 32 has an outer diameter slightly less than an inner diameter of the chamber 20 so that it is slidable therein with minimal tilting. The poppet 32 has an enlarged counterbore 44 opening inwardly and a smaller diameter coaxial pilot hole 46 concentrically positioned in the interior chamber 20. An orifice 47 is provided through the sidewall of the poppet 32.

The pilot hole 46 is normally closed by a pilot valve 48 releasably received in the poppet counterbore 44 and having a needle end 50 for selectively opening or closing the pilot hole 46.

The pilot valve 48 is integrally formed with a solenoid plunger 52 axially movable in the interior chamber 20 at the sleeve end 18. Particularly, the plunger 52 is coaxial with the pilot valve 48 and is positioned inwardly relative thereto. The plunger 18 is elongate in construction and has an outer diameter slightly less than an inner diameter of the interior chamber 20 to maintain the plunger 52 centered in the chamber 20. The pilot valve 48, being integral with the plunger 52, is guided in the same bore, i.e., the interior chamber 20, as is the plunger. As a result, the pilot valve needle end 50 is concentric with the pilot hole 46, eliminating the requirement for a guiding hole for the pilot valve needle end 50. The high guiding length of the plunger minimizes tilting of the pilot valve 48, as is apparent.

The use of a common bore 16 for both the pilot valve 48 and the plunger 52 simplifies construction while avoiding misalignment problems.

In the normally closed arrangement of the valve 10, the plunger 52 is biased outwardly by a helical coil spring 54 acting between a shoulder 55 of a plunger inner end counterbore 56 and a plug or stop 60. The spring 54 has sufficient strength to urge both the pilot valve 48 and the poppet 32 outwardly into the seated arrangement of FIG. 2. The position of the stop 60 defines full stroke movement of the plunger 52 and the pilot valve 48 between a first or closed position, shown in FIG. 2, and a second or full open position (not shown) when the plunger 52 engages the stop 60. The amount of full or maximum stroke movement is represented by a gap G between the stop 60 and the plunger 52 under bias of the spring 54.

The poppet orifice 47 provides a bleed passage for fluid communication between the side port 30 and a pilot chamber 62 defined by the poppet counterbore 44. Thus, in the normally closed position wherein the pilot valve 48 is closing the pilot opening 46, fluid pressure at the side port 30 is transmitted through the poppet orifice 47 into the pilot valve chamber 62 and acts to maintain the poppet valve 32 in the closed position illustrated in FIG. 2, in cooperation with the spring 54.

The pilot valve 48 is reciprocally moved from the seated position illustrated by suitable reciprocal, longitudinal movement of the plunger 52 inwardly toward the stop 60 under the control of a solenoid coil 64 of conventional construction. The stop 60 is secured as by a threaded connection at 66 to the housing sleeve end 18 and using a suitable locking compound and sealed with an O-ring 67. Alternatively, the plug 60 could be connected to a sleeve end 18 using a swaged connection.

A plug inner end 68 is threaded. A nut 70 is threaded to the threaded end 68 to clamp the solenoid coil 64 between the nut 70 and a flange 72 integral with the valve housing 12 at the sleeve end 18.

In accordance with the invention the valve 10 is provided with an adjustable stroke. The stop 60 has a through bore 80 coaxial with a threaded inner end counter bore 82. The through bore 80 is coaxial with the plunger counterbore 56. The plunger 52 includes a coaxial through bore 84 closed by the integral pilot valve 48.

An elongate rod 86, having an enlarged outer head 88, extends through the stop bore 80 and the plunger bore 84. A screw 90 is threaded into the stop counter bore 82 as at 92. The rod 86 is captured between the pilot valve 48 and the screw 90. A locking nut 94 on the screw 90 maintains a desired screw position. The screw 90 has a knurled head 96. By adjusting the screw 90, by turning the screw head 96, a variable gap V is provided between the head 88 and the pilot valve 48 to limit axial movement and thus stroke of the pilot valve 48. In accordance with the invention the rod 86 can be integrally formed with the screw 90.

Energization of the coil 64 as by applying electrical power across conductors 74, see FIG. 1, creates a magnetic field in space occupied by the plunger 52 to cause the same to move inwardly against the force of the spring 54 until it abuts the plug 60. Inward movement of the plunger 52 which is integrally associated with the pilot valve 48 causes inward movement of the pilot valve 48 so as to unseat the needle end 50 from the poppet pilot hole 46. Thereafter, pressure at the side port 30 is greater than pressure at the pilot hole 46 and a lifting force moves the poppet 32 forward inwardly to provide fluid flow between the side ports 30 and the end port 26. Movement can be further restricted, to adjust stroke, by turning the screw 90 so that the variable gap V is less than the full stroke gap G. With stroke adjusted the plunger 52 and pilot valve 48 move only until the pilot valve 48 abuts the head 88. Adjusting the stroke is used to control flow rate through the valve 10.

Advantageously, the valve housing 12 is of a non-magnetic material such as, for example, aluminum, brass, bronze or stainless steel. The use of such a non-magnetic material is believed less expensive than a magnetic material and eliminates the requirement for filters or screens in fluid ports, in use.

Figure 3:
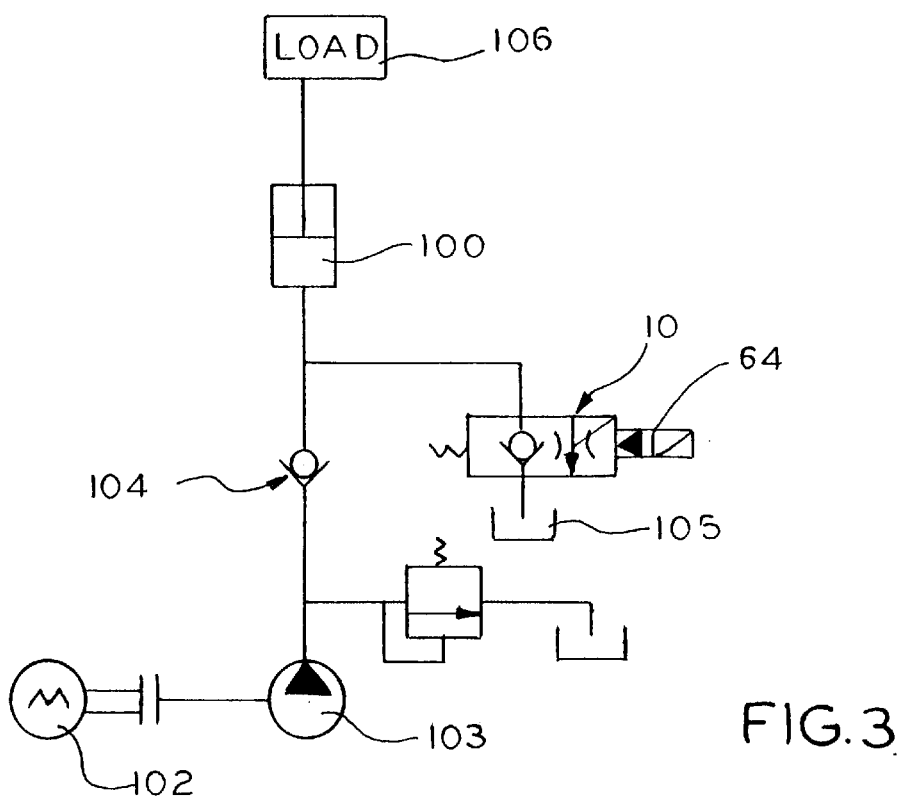
FIG. 3 is a hydraulic schematic of an application for the valve of FIG. 1.

The valve 10 according to the invention is illustrated in a typical application schematically in FIG. 3. In this application, for automotive use, the valve 10 is used with a cylinder 100 to replace conventional shock absorbers for "low rider" shocks.

With the solenoid 64 deenergized and a motor 102 on driving a pump 103 fluid is pumped via a check valve 104 to the cylinder 100. This raises a load 106. To lower the load 106 the motor 102 is turned off. The solenoid 64 is energized. This opens the valve 10 and fluid returns from the cylinder 100 to a tank 105. This lowers the load 106. The stroke of the valve 10 is adjustably selected, as described above, to control the return flow rate. By using the adjustable stroke valve 10 there is no need for a separate needle valve to control return flow rate.

Thus, in accordance with the invention, there is disclosed a low cost adjustable stroke solenoid operated cartridge valve suitable for use in high pressure applications. Economies of manufacturing are provided by the use of a one-piece valve housing which can be made as a screw machined part. A common bore is provided for the poppet, plunger and pilot valve. Further economies are obtained by using a pilot valve integrally formed with a plunger which results in use of less parts and more reliable control. The guiding length of the plunger is sufficient to minimize tilting of the pilot valve to maintain concentricity for guiding the pilot valve relative to the poppet pilot hole. This in connection with the one piece housing allows one common bore for guiding the plunger with the pilot and also the poppet. The adjustable stroke eliminates the need for a separate needle valve.

I claim:

1. An adjustable stroke solenoid operated cartridge valve, comprising:

an elongate cylindrical valve housing having an axial bore defining an interior chamber, one end of said housing comprising a port end including a plurality of port openings, and an axial opposite end comprising a sleeve end receivable in a solenoid, in use;

a valve member movable in said chamber at the port end between first and second valve positions for selectively coupling said port openings, said valve member having an axial pilot through bore defining a pilot chamber;

a solenoid plunger movable in said interior chamber at the sleeve end;

a pilot valve movable in said pilot chamber for selectively opening or closing said pilot through bore, said pilot valve being integrally formed to said plunger for axial movement therewith for selectively positioning said pilot valve and thus also said valve member;

a stop mounted to said valve housing at the sleeve end for retaining the plunger in said chamber to provide full stroke movement of the pilot valve between first and second axial positions;

biasing means operatively associated with said plunger for normally maintaining said pilot valve in one of said first and second axial positions; and adjustable means operatively associated with said valve housing for adjustably directly limiting movement of the pilot valve between the first and second axial positions to control flow rate through the cartridge valve.

2. The cartridge valve of claim 1 wherein said plunger and said pilot valve are both guided in said valve housing axial bore.

3. The cartridge valve of claim 1 wherein said pilot through opening comprises a relatively large diameter counterbore opening into said chamber coupled to a relatively small diameter coaxial pilot hole adjacent said housing port end.

4. The cartridge valve of claim 3 wherein said pilot valve is loosely received in said counterbore and said pilot valve has a needle end received in said pilot hole for selectively opening or closing said pilot hole.

5. The cartridge valve of claim 4 wherein said plunger is an elongate plunger having an outer diameter slightly less than an inner diameter of said housing through bore to maintain said plunger centered in said valve housing so that said pilot valve needle end is concentric with said pilot hole.

6. The cartridge valve of claim 1 wherein said valve housing is of non-magnetic material.

7. The cartridge valve of claim 1 wherein said biasing means comprises a spring received in said chamber and acting between said stop and said plunger for normally maintaining said valve member in one of said first and second valve positions.

8. The cartridge valve of claim 1 wherein said adjustable means comprises an elongate rod extending through said valve housing for selectively engaging the pilot valve to limit movement between the first and second axial positions.

9. The cartridge valve of claim 8 wherein said adjustable means further comprises a screw operatively associated with the rod, the screw being threadably received in the housing for adjusting axial position of the rod in the valve housing.

10. The cartridge valve of claim 9 further comprising a lock nut threaded to the screw for maintaining the rod in a desired axial position.

11. An adjustable stroke solenoid operated cartridge valve, comprising:
   an elongate cylindrical valve housing having an axial counterbore at a sleeve end defining an interior chamber, an axial opposite port end of said housing having an axial through bore opening to said interior chamber to provide an end port opening and defining a valve seat, and a radially extending through opening in said housing opening into said interior chamber and defining a side port opening, said sleeve end being receivable in a solenoid, in use;
   a valve member movable in said chamber between a first valve position seated on said valve seat for selectively preventing coupling between said end and side port openings and a second valve position spaced from said valve seat for coupling said end and side port openings, said valve member having an axial pilot through bore defining a pilot chamber;
   a solenoid plunger movable in said interior chamber at the sleeve end;
   a pilot valve movable in said pilot chamber for selectively opening or closing said pilot through bore,
   said pilot valve being integrally formed to said plunger for axial movement therewith for selectively positioning said pilot valve and thus also said valve member;
   a stop mounted to said valve housing at the sleeve end for retaining the plunger in said chamber to provide full stroke movement of the pilot valve between first and second axial positions;
   biasing means operatively associated with said plunger for normally maintaining said pilot valve member in one of said first and second axial positions; and
   adjustable means operatively associated with said valve housing for adjustably directly limiting movement of the pilot valve between the first and second axial positions to control flow rate through the cartridge valve.

12. The cartridge valve of claim 11 wherein said plunger and said pilot valve are both guided in said valve housing axial counterbore.

13. The cartridge valve of claim 11 wherein said pilot through opening comprises a relatively large diameter counterbore opening into said chamber coupled to a relatively small diameter coaxial pilot hole adjacent said housing port end.

14. The cartridge valve of claim 13 wherein said pilot valve is loosely received in said counterbore and said pilot valve has a needle end received in said pilot hole for selectively opening or closing said pilot hole.

15. The cartridge valve of claim 14 wherein said plunger is an elongate plunger having an outer diameter slightly less than an inner diameter of said housing through bore to maintain said plunger centered in said valve housing so that said pilot valve needle end is concentric with said pilot hole.

16. The cartridge valve of claim 11 wherein said valve housing is of non-magnetic material.

17. The cartridge valve of claim 11 wherein said biasing means comprises a spring received in said chamber and acting between said stop and said plunger for normally maintaining said valve member in one of said first and second valve positions.

18. The cartridge valve of claim 11 wherein said adjustable means comprises an elongate rod extending through said valve housing for selectively engaging the pilot valve to limit movement between the first and second axial positions.

19. The cartridge valve of claim 18 wherein said adjustable means further comprises a screw operatively associated with the rod, the screw being threadably received in the housing for adjusting axial position of the rod in the valve housing.

20. The cartridge valve of claim 19 further comprising a lock nut threaded to the screw for maintaining the rod in a desired axial position.

21. An adjustable stroke solenoid operated cartridge valve, comprising:
   an elongate cylindrical valve housing having an axial counterbore at a sleeve end defining an interior chamber, an axial opposite port end of said housing having an axial through bore opening to said interior chamber to provide an end port opening and defining a valve seat, and a radially extending through opening in said housing opening into said interior chamber and defining a side port opening, said sleeve end being receivable in a solenoid, in use;
   a valve member movable in said chamber between a first valve position seated on said valve seat for selectively preventing coupling between said end and side port openings and a second valve position spaced for said valve seat for coupling said end and side port openings, said valve member having an axial pilot through bore defining a pilot chamber;
   a solenoid plunger movable in said interior chamber at the sleeve end;
   a pilot valve movable in said pilot chamber for selectively opening or closing said pilot through bore,
   said pilot valve being integrally formed to said plunger for axial movement therewith for selectively positioning said pilot valve and thus also said valve member;

a stop mounted to said valve housing at the sleeve end for retaining the plunger in said chamber to define a maximum stroke representing movement of the plunger and pilot valve between closed and full open positions;

biasing means operatively associated with said plunger for normally maintaining said pilot valve member in one of said closed and full open positions; and adjustable means operatively associated with said valve housing for adjustably limiting stroke to less than the maximum stroke by adjustably directly preventing movement of the pilot valve to the full open position to control flow rate through the cartridge valve.

* * * * *